Dec. 12, 1967   H. N. MALMIN ET AL   3,358,187
MASTER DIMMING SYSTEM FOR BALLASTS
Filed Aug. 6, 1964   3 Sheets-Sheet 1
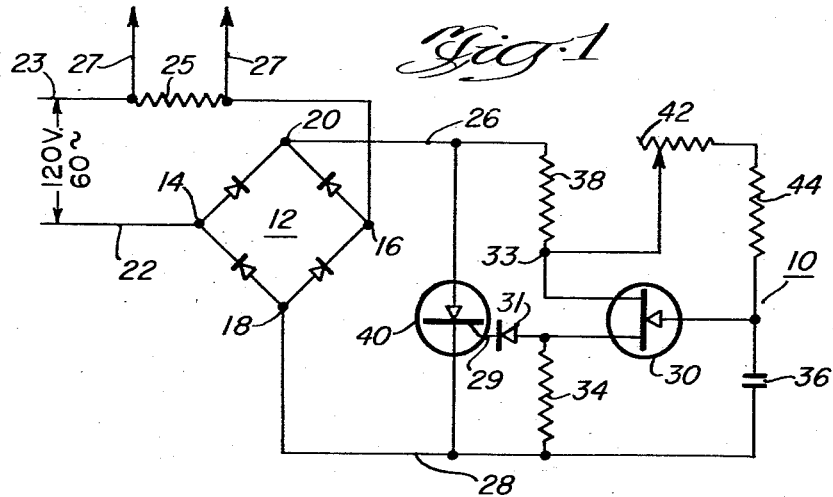
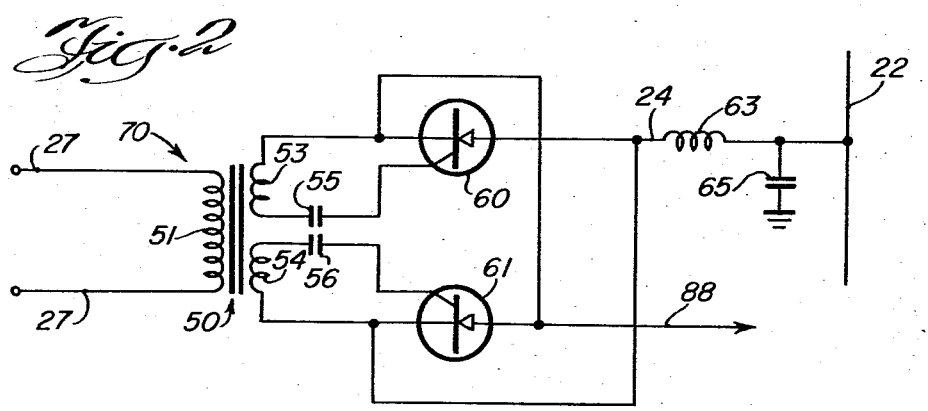
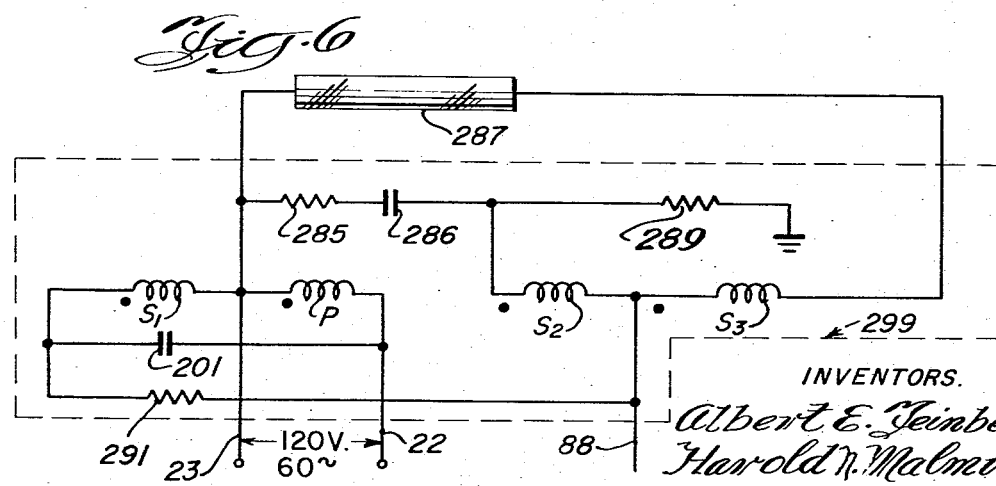
INVENTORS.
Albert E. Feinberg
Harold N. Malmin
BY Silverman + Cass
ATTORNEYS.

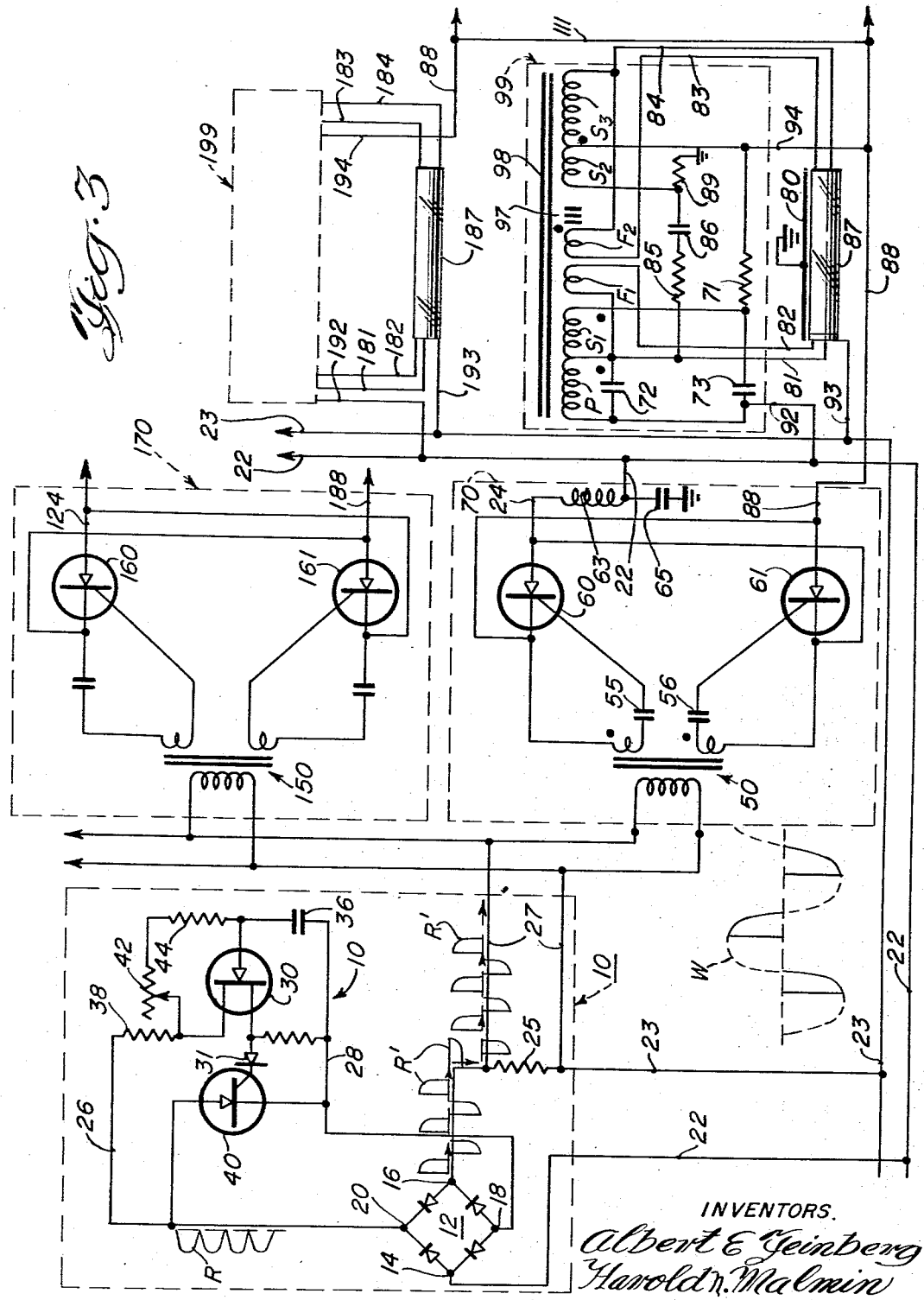

Dec. 12, 1967   H. N. MALMIN ET AL   3,358,187
MASTER DIMMING SYSTEM FOR BALLASTS
Filed Aug. 6, 1964   3 Sheets-Sheet 3

INVENTORS:
Albert E. Feinberg
Harold N. Malmin
BY Silverman & Cass
ATTORNEYS

United States Patent Office 3,358,187
Patented Dec. 12, 1967

3,358,187
MASTER DIMMING SYSTEM FOR BALLASTS
Harold N. Malmin and Albert E. Feinberg, Chicago, Ill., assignors to Advance Transformer Co., Chicago, Ill., a corporation of Illinois
Filed Aug. 6, 1964, Ser. No. 387,917
18 Claims. (Cl. 315—200)

ABSTRACT OF THE DISCLOSURE

An apparatus for controlling the flow of current through a plurality of fluorescent lamps from an alternating current source in which a master control circuit having a variable resistor coupled to a charging circuit selects a portion of the voltage wave from the alternating current source for transmission to a plurality of current control circuits. The transmitted voltage wave activates one of two silicon controlled rectifiers in each of the plurality of current control circuits and causes a control lead from each of the current control circuits to each of the ballast circuits to be short circuited to the alternating current source for igniting and energizing the plurality of fluorescent lamps.

---

This invention relates to control arrangements for gaseous discharge devices and more particularly, in an important aspect, to a master dimming system for simply and singly controlling electrical energy discharge for generating illumination by a plurality of fluorescent lamps.

The technology of controlling discharge devices has been extensively explored with a resulting multiplicity of circuit arrangements for accommodating diverse and, oftentimes, perverse behaviors of discharge devices. Particulary important among such devices are fluorescent lamps, through the multiple employments to which such fluorescent lamps be usefully applied. The control of such discharge devices is rendered complex by the fact that these devices necessarily operate at two fundamental voltage levels, the one level to ignite a discharge, and the other to energize the continuing discharge for generating useful illumination. The discharge having been initiated, there has remained the problem of varying the level of illumination provided by the discharge devices. This problem has been rendered particularly acute in the situation where multiple similar sized lamps having discharge characteristics varying from lamp to lamp are sought to be controlled.

In this general area, there have recently been granted three French patents to the Compagnie Francaise Thomson-Houston numbered 1,319,946, 1,320,547 and 1,321,-112. These patents have taught arrangements for controlling the illumination level of multiple lamps. In accordance with these patents, there are taught rectifying bridges of differing circuit connections arranged to select variable portions of cycles of an energizing alternating current wave. The so selected wave portions are thereafter applied variably to energize appropriate ballast circuits associated with plural discharge devices such as fluorescent lamps.

It is a principal object of the present invention to provide a simplified unitary master control structure for singly controlling the operation of multiple discharge devices.

It is a still further object of the invention to provide a novel lamp current control arrangement for either single or multiple cooperation with the aforementioned master control structure and for supplying selectively variable energizing wave portions to plural lamp ballast circuits under control of the aforementioned master control structure.

It is still a further object of the invention to provide lamp current control arrangements employing current transmitting elements arranged for avoiding control circuit disturbances by spurious electrical phenomena.

The invention will be more clear and other objects, features and advantages thereof will become apparent from a consideration of the following brief description of illustrative embodiments of the invention as shown in the drawings and from a consideration of the appended claims.

In the drawings:

FIG. 1 is a schematic diagram of a unitary master control timer unit for singly exercising dimming control on a multiplicity of fluorescent lamp discharge devices in accordance with the invention.

FIG. 2 is a schematic diagram of a lamp current control circuit for plural operation with the unitary master control timer unit illustrated in FIG. 1.

FIG. 3 is a schematic diagram of a multiple lamp illuminating system under control of a single unitary master control timing unit and plural current control circuits in accordance with the invention.

Figure 4:
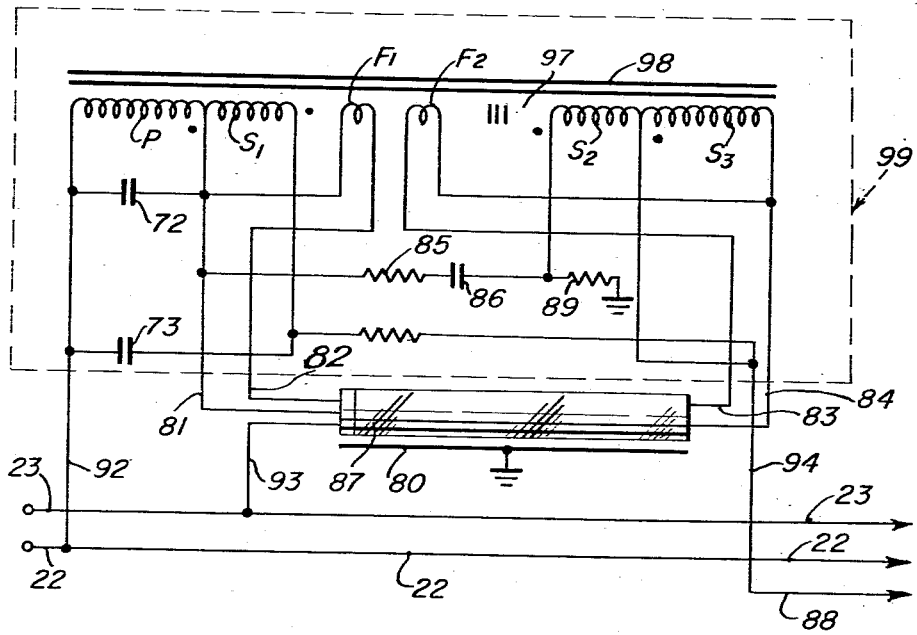
Figure 5:
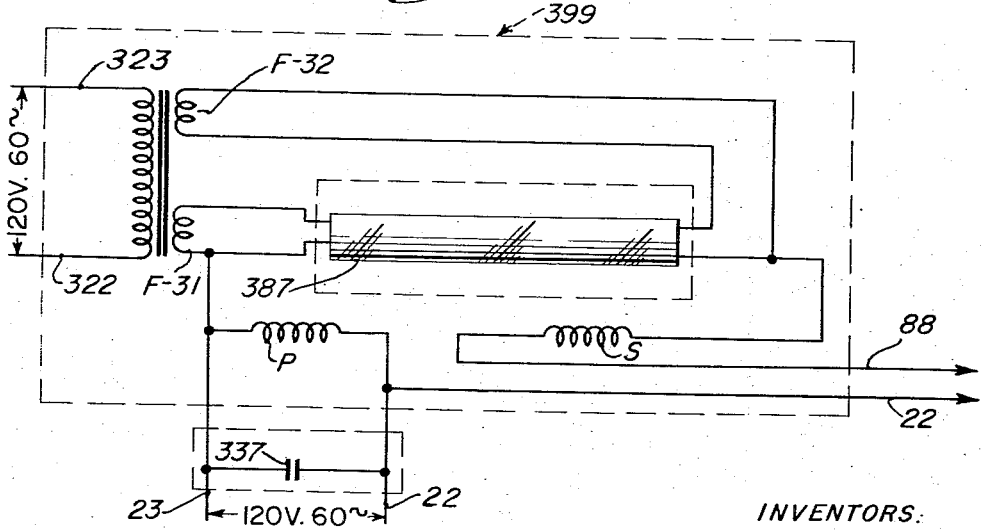

FIGS. 4, 5, and 6 are schematic diagrams of lamp energizing ballast circuits alternatively operable with advantage in cooperation with the master control circuit of FIG. 1 and the current control circuit of FIG. 2.

The invention comprises generally a rectifying bridge arrangement of substantially conventional configuration having a first pair of diagonally opposite bridge terminals adapted for connection to a source of alternating current by way of a resistor impedance element across which control signals are derived. Across the remaining pair of bridge terminals, there are provided two cooperative parallel connected conduction paths. The one path comprises the conduction terminals of a silicon controlled rectifier.

The other parallel connected path is somewhat more complex. This other path comprises the conduction terminals of a unijunction transistor connected in series with a voltage developing resistor. Further, in this other control path there is provided a large variable resistor in a charging path for a capacitor which is connected to a control electrode, an emitter electrode, of the aforementioned unijunction transistor. In a normal condition, that is, in a quiescent condition of the aforementioned bridge, only a small conduction current is provided between the second pair of bridge terminals for charging the aforementioned capacitor. Following familiar bridge theory, only a small conduction will be permitted from the alternating current source by way of a first pair of bridge terminals so long as a small current flows from the remaining terminal pair. Thus, only a vestigial control signal will be provided across the aforementioned control signal deriving resistor. Such a quiescent, non-conducting bridge condition is upset, however, by conduction through the first of the aforementioned parallel connected conduction paths, including the silicon controlled rectifier. Thus, as the silicon controlled rectifier conducts, the bridge is unbalanced permitting full current to flow between the first bridge terminal pair. Hence, control signals are developed across the aforementioned resistor. Such conduction by the silicon control rectifier is simply and effectively controlled in accordance with the invention by variable charging of the unijunction-transistor-associated capacitor to a firing potential for that unijunction transistor.

Thus, in accordance with the invention, as the capacitor is charged to fire the unijunction transistor, conduction by this transistor develops a firing signal for the silicon controlled rectifier. In this way the balance of the rectifying bridge is upset to allow current conduction from the alternating current source through the signal developing, series connected resistor.

The selectively variable duration signals so derived across the aforementioned resistor which is connected to a source of alternating current power, are applied in controlling relation to a plurality of current control circuits by way of like plural transformers having primary windings connected in parallel across the aforementioned series resistor. These transformers have two secondary windings of like polarity, each connected between a control electrode and a cathode electrode of a silicon controlled rectifier. The anode electrodes of the two rectifiers are respectively connected to one side of an alternating current power lead and to a control lead. These two silicon controlled rectifiers, further, each have the cathode electrode of one connected in common with the anode electrode of the other. That is, the two rectifiers are connected in closed series conduction relation.

Hence, this control lead effectively provides a short circuit connection to one side of the power source so long as one or the other of the rectifiers is conducting. Further, the cathode-anode connections of the rectifiers are so oriented that current conduction through the aforementioned power line connected resistor, enables conduction by one rectifier or the other. The control lead short circuit connection, in turn, is connected to a plurality of lamp energizing ballast circuits for enabling these circuits to apply lamp energizing potentials to the associated lamps.

It is to be noted that, in accordance with the invention, the ballast circuits are continuously energized from the source of alternating current potential to one side of which one rectifier of the current control circuit is connected. Nonetheless, in accordance with the invention, only upon application of a short circuit signal on the aforementioned control lead to these ballast circuits, are these energizing potentials from the alternating current source made effective to ignite and operate the ballast associated lamps.

Referring now more particularly to the drawings, in FIG. 1 there appears a master control timer unit 10 in accordance with the invention. This timer unit comprises a well known rectifier bridge circuit 12 in which two pairs of series connected diode rectifiers are connected on opposite sides of the bridge. The bridge comprises diagonally opposite pairs of terminals 14, 16 and 18, 20. The input terminals 14, 16 are connected, in turn, across a source of alternating current, indicated but not shown specifically in the drawing, by way of leads 22 and 23 respectively. The lead 23 includes a signal developing resistor 25 having output leads 27 connected thereacross.

The bridge output terminals 18, 20 are connected in turn to two parallel paths by leads 26, 28 as shown. The one parallel path includes simply the conduction electrodes of a silicon controlled rectifier 40 connected between leads 26 and 28. The second, more complex parallel conduction path between leads 26 and 28 is by way of a resistor 38 through the conduction electrodes of a unijunction transistor 30 and a voltage developing resistor 34. Further, from a common connection point 33 between resistor 38 and the unijunction transistor 30 the second parallel path comprises a variable resistor, potentiometer 42, a fixed biasing resistor 44, and a capacitor 36. A common point between capacitor 36 and resistor 44, in turn, is connected to a control electrode, the emitter electrode, of the unijunction transistor 30. A forwardly poled diode 31 is connected between a conduction electrode of unijunction transistor 30 to control electrode 29 of rectifier 40. As shown, the diode 31 is connected, also, in common with one terminal of resistor 34. This voltage developing resistor 34 is connected from the aforementioned conduction terminal to the lead 28.

Thus, as an input alternating wave is applied to leads 22 and 23 without significant conduction from terminals 18, 20 of that bridge 12, the bridge effectively constitutes an open circuit. Accordingly, only little current will flow between the terminal pair 14, 16. As a consequence, no voltage signal will be developed across the resistor 25, and thus no signal will be applied along lead pair 27.

So much for the quiescent condition of the master control timer unit of FIG. 1. As an alternating voltage wave is applied between the terminal pair 14, 16, conduction takes place from terminal 16 through terminal 20 by way of lead 26, resistor 38, potentiometer 42 and resistor 44 to charge capacitor 36. As this capacitor is charged to a suitable potential level, this potential is applied to the emitter electrode of the unijunction transistor 30 to drive this transistor in conduction. Accordingly, conduction takes place by way of resistor 38, unijunction transistor 30 and resistor 34. Thus a positive going signal is developed at the top of resistor 34. This positive going signal is coupled by way of diode 31 to control electrode 29 of silicon controlled rectifier 40. Thus the silicon controlled rectifier is turned on. Accordingly, a short circuit is effectively connected across leads 26 and 28 and, consequently, across bridge terminals 18, 20 in dependence upon the conduction level of the silicon controlled rectifier 40. As a consequence, current flows freely between bridge terminals 14, 16 through voltage developing resistor 25 from the instant capacitor 36 which is charged to a suitable turn-on potential for the unijunction transistor 30. This instant in the cycle of the wave applied from the leads 22, 23, it will be recalled, is controlled by the level of resistance established by the adjustment of potentiometer 42. Thus, there is developed across the resistor 25 a voltage signal corresponding to selected portions of an alternating voltage wave applied to leads 22, 23.

Looking next to FIG. 2, in this schematic diagram of a current control circuit 70 in accordance with the invention it is seen how these selected portions of the alternating signal are employed in accordance with the invention. This signal, appearing across resistor 25 and representing selected portions of a sine wave, is applied to the primary winding 51 of a transformer 50. This transformer 50 comprises first and second secondary windings 53, 54 of like polarity as indicated. These secondary windings are respectively connected between the control and cathode electrodes of a pair of silicon controlled rectifiers 60, 61 by capacitors 55, 56 as shown. Leads 24 and 88 are respectively connected to the anode electrodes of the aforementioned silicon controlled rectifiers. The cathode electrodes of both these paired rectifiers are connected to the anode electrodes of the opposite one of the two paired rectifiers. Thus, the conduction paths of the two rectifiers are series connected. The capacitors 55, 56 serve simply as coupling elements between the cathode and control electrodes of the silicon controlled rectifiers to preclude development of a direct current biasing potential between these electrodes. The secondary windings, 53, 54 are oriented for controlling one rectifier or the other to conduct upon current flow in resistor 25.

The anode electrode of one of the silicon controlled rectifiers 60 is connected by way of lead 24 through a radio frequency choke 63 to an alternating current supply lead 22, which, it will be recalled, is a lead connected to the source of alternating current as noted in connection with discussion of FIG. 1. A capacitor 65 is connected between that lead 22 to ground, as shown. Thus, capacitor 65 serves in conjunction with the inductance of choke 63 to provide filtering action in accordance with well known theory to preclude transmission of high frequency, spurious signals to the power lead 22 from the current control circuit 70 as illustrated.

Turning next to the circuit of FIG. 3, there is shown a complete circuit diagram of an operating system for control of illumination from a plurality of fluorescent lamps by apparatus, in accordance with the invention. In this schematic diagram of FIG. 3 designated numerals corresponding to those of FIGS. 1 and 2 have been employed for ease of understanding of the relation of this FIG. 3 circuit diagram to the component elements thereof shown heretofore.

A pair of alternating current supply leads 22, 23 are shown adapted for connection to a source of alternating current, not shown specifically in this drawing. These leads are connected by way of a signal output resistor 25 to a diagonally opposite pair 14, 16 of terminals of a rectifying bridge 12. From the remaining bridge terminal pair 18, 20 a succession of simple half sine wave rectified voltage pulses are applied to leads 26 and 28 as shown. Following the discussion of the master control timer unit of FIG. 1, the rectified half wave pulses R give rise to a wave R', representative of selected portions of an alternating voltage wave developed across resistor 25 for application to the leads 27 as illustrated. The wave R' representative of selected portions of the voltage wave appearing on leads 22, 23 is applied to plural, parallel connected primary windings of plural transformers 50, 150 which are respectively associated with plural current control circuits 70, 170. The voltage wave W appearing between leads 22 in 23 is shown for ease in understanding the relation of this wave to the wave R', which is developed for application to the plural current control circuits in accordance with the invention. Thus, the effective portion of wave form W which appears on leads 27 for controlling these current control circuits, is shown in solid outline. The remaining portion of the voltage wave on the leads 22, 23 is shown in dashed dot outline in the wave form W.

As discussed in connection with FIG. 2, the illustrated solid portions of wave W give rise to a short circuit connection signal on leads 88, 188 respectively associated with the current control circuits, 70, 170 illustrated. The control lead 88 is connected in common to plural ballast circuits 99, 199 respectively associated with fluorescent lamps 87, 187.

In this FIG. 3 it is clear that each of the plural ballasts are connected alike to the alternating current supply leads 22, 23 and each have like connections to the control lead 88.

Turning attention more particularly to the circuits of the ballast 99, the advantageous operation of the control circuits ni accordance with the invention becomes more clear. This representative ballast arrangement 99 is enclosed within a canister, indicated by dashed lines but not designated numerically. From this canister, exterior leads 81, 82, 83, 84, 92, 93, and 94 emerge for connection as discussed below. Power lead 22 is connected to lead 92 and lead 93 is connected to lead 23, thus alternating current is supplied by leads 22 and 23 continuously to the ballast 99. A fluorescent lamp 87 is inserted in appropriate holders associated with the ballast 99 in conjunction with a reflective grounded plate 80, as well known in the art. Upon insertion of the lamp 87 in these appropriate well known holders, a filament at one end, the left hand end, of this lamp are connected to leads 81, 82 and by way of lead 93 to the alternating current power lead 23. The remaining lamp filament leads associated with the right hand end of the lamp 87 are connected upon insertion of the lamp to ballast exterior leads 83 and 84. Of the remaining ballast exterior leads, 92 is connected to other power lead 22 and lead 94 is adapted for connection to the control lead 88.

Within the ballast 99, the lead 92 is connected to one end of a primary winding P having connected thereto a secondary winding $S_1$ in autotransformer relation. Both windings are mounted on a common core 98, indicated schematically. Also mounted on this common core 98 are filament windings $F_1$ and $F_2$ which are connected respectively by way of leads 81, 82 and 83, 84 to the left and right hand filaments associated with the lamp 87. A gapped shun 97 in the core 98 separates secondary windings $S_2$, $S_3$, also wound on this core. A capacitor 72 is shown connected across the primary winding P for short circuiting spurious radio frequency signals. A similar power factor correcting capacitor 73 is shown connected across both the primary winding P and the secondary winding $S_1$. A common point between the two auto-transformer windings, P and $S_1$ is connected by way of a resistor 85, a capacitor 86, and another series resistor 89 to ground as illustrated. Still a third resistor 71 provides connection from capacitor 73 by way of a terminal on secondary winding $S_1$ to the ballast external lead 94.

Let us look to the operation of this ballast winding in the igniting and operating of lamp 87. Assume, as is the normal situation, leads 22 and 23 are energized with 60 cycle, 120 volt A.C. Assume, too, that neither of the silicon controlled rectifiers 60, 61 is fired. This 120 v. A.C. is coupled from leads 22, 23 by way of lead 93 to the left hand filament of lamp 87, by way of leads 81 and 92 to energize the primary winding P. Thus, by autotransformer action an increased voltage is applied across power factor correcting capacitor 73. This voltage is further applied across resistor 71 to the exterior lead 94. This exterior lead, as shown, is connected to the control lead 88 which, in turn, is connected to the anode electrode of silicon controlled rectifier 61. We have assumed this latter rectifier and its companion controlled rectifier 60 to be non-conducting. Thus the lead 94 appears to be open-circuited. All the while the filament energizing windings $F_1$ and $F_2$ provide induced heating potentials on the filaments at opposite ends of the lamp 87 as shown.

Secondary windings $S_2$ and $S_3$, as indicated by the conventional dots, are wound in opposing relationship to the windings P and $S_1$. Accordingly, the overall effective potential applied between the filaments at opposite ends of the lamp 87 is not of a magnitude to initiate conduction between the filaments. Capacitor 86 is charged with the alternating wave appearing on leads 22, 23 through resistors 85, 89 and the filaments in both ends of the lamp 87 are heated by voltages induced in the lamps in the filament windings $F_1$, $F_2$.

Now assume that one of the silicon controlled rectifiers 60 or 61, for purposes of definiteness let it be controlled rectifier 61, is fired. Immediately control lead 88 is connected through this rectifier conduction path by way of the lead illustrated to the anode lead 24 associated with the companion controlled rectifier. This lead 24, as we have seen, is conductively connected, through the inductor 63, directly to lead 22, one of the two alternating current power leads. Thus, from the instant of firing of one of the two controlled rectifiers in the current control circuit 70, the control lead 88 is effectively short-circuited to the power lead 22.

For ease of visualization, assume then that the primary winding P has a voltage from left to right. By the indicated sense of the windings $S_2$, $S_3$, opposing voltages from right to left are induced in these latter windings but the coupling capacitor 86 has a charge residing thereon poled for directing current flow through winding $S_2$ from left to right, that is, in a direction opposed to the voltage induced therein by current flowing in primary winding P. Hence, as the lead 94 intermediate windings $S_2$, $S_3$ is short circuited to lead 22, the capacitor 86 tends to discharge from left to right, in our assumed conditions, through winding $S_2$. Now $S_2$ and $S_3$ are both wound in a like sense for opposing the voltage induced by primary winding P. Thus, as the current from capacitor 86 discharges through winding $S_2$ by way of lead 94, then additional voltage is built up in winding $S_3$. This latter induced voltage now is in aiding relationship with the voltage in primary winding P.

Recalling that the right hand terminal of secondary winding $S_3$ is connected by lead 84 to the right hand filament associated with lamp 87, it becomes immediately apparent that current conduction from the lead 94 by way of the control lead 88 applies an igniting pulse to lamp 87 with discharge of capacitor 86. Thereafter the connection of this left terminal of winding $S_3$ to the left terminal of winding P insures continuing operating potentials being applied across the filaments of lamp 87. Thus, absent the short circuit connection of lead 88, the voltage opposing windings P and $S_3$ are floating with regard lamp 87. As soon as the lead 88 is connected, in accordance with the invention, from the left side of winding $S_3$ to the left side of winding P, a complete conduction path is established from the right terminal of winding P, through the ignited lamp 87, to the right terminal of winding $S_3$. Thence, the conductive loop is completed from the left terminal of winding $S_3$ by way of leads 88, 22 and 92 again to the left terminal of winding P. Thus as the control lead 88 is short circuited to one of the alternating current power leads 22 by the firing of one of the silicon controlled rectifiers in the current control circuit, the representative lamp 87 associated with the ballast 99 immediately begins conduction.

Now, in this drawing, it will be observed that the control lead 88 is similarly connected to the ballast 199 arranged in controlling relation with the lamp 187. By action identical to that discussed heretofore in connection with the ballast 99, this second lamp 187 of the plurality of such lamps, which may be associated with the control lead 88, is driven into conduction also under control of the master control timer unit 10, discussed heretofore in connection with FIG. 1.

Thus, recapitulating the behavior of the circuits heretofore discussed, alternating current from a source delivered by way of leads 22 and 23 is applied to diagonally opposite terminals of a rectifying bridge 12 through a control signal developing resistor 25. A portion of the alternating wave applied from leads 22, 23 is selected by operation of potentiometer 42 for application to leads 27. These so selected portions of the alternating wave appearing on leads 22, 23 serve to actuate alternatively two paired silicon controlled rectifiers in each of plural current control circuits 70, 170. Conduction by either of the controlled rectifiers in the plural current control circuits establishes a short circuit condition between a control lead from each of the current control circuits and one of the alternating current power leads. Thus, bearing in mind the short circuited condition of the plural control leads 88, 188, the associated plural ballast circuits are driven to a condition for first igniting and thereafter, continuously energizing respectively associated discharge devices.

Looking next to FIGS. 4, 5 and 6 it clearly appears that the lamp dimming control arrangements discussed heretofore are not limited to advantageous employment with a single type of ballast. For ease of understanding, ballast 99 employed in the circuit arrangement of FIG. 3 is shown in enlarged detail in FIG. 4. Comparable but different arrangements are shown in FIGS. 5 and 6. In this FIG. 4, ballast circuit elements comparable to those discussed in connection with FIG. 3 are shown with similar designating numerals. This FIG. 4, indeed, serves the principal useful function of relating the interconnection of this already discussed ballast to control circuits in accordance with the invention to the similar interconnection of the related ballast circuit arrangements of FIGS. 5 and 6 to these same control circuits.

In this FIG. 4, the lamp reflector 80 is shown in grounded connection in reflective association with the lamp 87. The alternating current power leads 22 and 23 are shown connected, by way of leads 92 and 93, through the lamp 87 and lead 81 across the primary winding P. The exterior leads 92, 93 of the ballast are shown connected to the alternating current power leads 23, 22. An important feature of this ballast 99 which appears more clearly in FIG. 4 than in FIG. 3 is the increased number of turns in the windings $S_3$ over those in the series connected windings $S_2$.

Thus, looking in outline to the ballast of FIG. 4, alternating current appearing on leads 22, 23 is applied by way of leads 92, 93 to energize the primary winding of this ballast. As a result of this energizing, heater currents are applied for filament windings $F_1$ and $F_2$ to opposite ends of the lamp 87. In a quiescent condition, by virtue of the isolation of windings $S_2$, $S_3$ with respect to the primary winding P, no effective voltage is applied between leads 81, 84 exterior to the ballast canister for either igniting or energizing a discharge current in the fluorescent lamp 87. As the control lead 88 is short circuited to power lead 22 by operation of the current control circuit in accordance with the invention, the potential across winding $S_3$ which heretofore opposed the potential of winding P is now reversed by discharge of capacitor 86 through lead 94 and the short circuited control lead 88. Thus, effectively the left hand end of the winding $S_3$ is connected directly to the left hand end of the winding P upon firing of either of the controlled rectifiers in the associated current control circuit. Thus, this firing not only applies an igniting pulse across lamp 87, but establishes a complete conductive circuit through the lamp.

Turning next to the circuit shown in FIG. 5, the relationship to the circuit of FIG. 4 becomes immediately apparent. Here it should be observed that, for simplicity, in neither FIGS. 5 nor 6 are cores shown for the several windings. Such cores are implicit in these structures and correspond to those of FIG. 4. The voltage step-up feature associated with the windings $S_2$, $S_3$ is not requisite for advantageous employment of the control circuits in accordance with the invention. In this figure alternating current supply leads 22, 23 are shown spaced apart by a filter capacitor 337 for shorting any transient spikes which may appear across these leads to disturb the normally sinusoidal wave forms supplied thereto. The simplified ballast 399 is shown in FIG. 5 enclosed in dashed lines. An associated lamp 387 is shown enclosed within a dashed box interior to the ballast. Power leads 322, 323 are shown adapted for connection to an entirely separate power source from the power source associated with leads 22, 23. These leads 322, 323 are associated with a pair of secondary windings each associated with filament windings at opposite ends of the lamp 387. Thus heater current is supplied to these separate secondary windings powered by leads 322 and 323. The power lead 22 and the control lead 88 are shown extending exteriorly of the ballast 399 to relate to similarly numbered leads in FIG. 4.

In the quiescent condition, filaments at the opposite ends of the lamp 387 are energized by the two secondary windings F–31, F–32. The secondary winding S illustrated is conductively isolated from the primary winding P. This secondary winding is conductively connected to the right hand lamp filament as shown but by virtue of the above noted conductive isolation, no lamp energizing potential exists between the two filaments at opposite lamp ends. Accordingly, no ignition or operating potential exists across the fluorescent lamp to initiate or maintain illuminating conduction therethrough.

Now the short circuit connection of the right hand extending leads 88, 22 by a current control circuit in accordance with the invention corrects this deficiency. Thus, short circuiting signals appearing on lead 88 permit control of the illumination level of lamp 387 by variably selecting the portions of energizing alternating waves applied to the ballast 399 which may effectively ignite and operate this lamp.

Turning next to the alternative ballast arrangement 299 of FIG. 6 and noting the similarity of numerical designators appearing therein to the comparable elements of FIGS. 4 and 5, the versatility of control arrangements in accordance with the invention is emphasized.

In this FIG. 6 power supply leads 23, 22 are shown adapted to be connected to a source of alternating current. These power supply leads are connected directly to a transformer primary winding P wound in series aiding relation with autotransformer secondary winding $S_1$ and connected by way of capacitor 286 and resistor 285 in series opposition with secondary windings $S_2$, $S_3$. As shown, one side of the primary winding is connected directly to the left hand end of the lamp 287. Meanwhile the right hand end of the lamp is connected directly to the right hand end of the secondary winding $S_3$. Resistor 291 isolates lead 88 from the left hand end of the secondary winding S₁.

Now the operation of this arrangement is very similar to that of the ballast 99 considered heretofore in the discussion of FIG. 3. Absent firing of an associated current control circuit controlled rectifier, lead 88 is open, no complete conduction path exists to connect left and right hand filaments and, too, a charge is established on the capacitor 86. The secondary windings S₂, S₃ are wound in electromagnetically opposing relation to the primary winding P. Accordingly no sufficient igniting and discharge sustaining potential is applied across the lamp 287.

Now, however, consider the conditions obtaining when the lead 88 is conductively connected to the power lead 22. The capacitor 286 discharges through secondary winding S₂ to leads 88, 22 to yield an initial starting pulse for lamp 287 by way of winding S₃ and the formerly opposing potentials of the two windings S₂, S₃ are brought into aiding relation with the potential of the primary winding by the connection of lead 88 to power lead 22 and, consequently, to the right side of winding P. Accordingly, the effectively self nullifying voltages generated across the transformer windings are shifted to an additive relation for sustaining discharge in the lamp. Clearly, as considered heretofore in connection with the discussion of FIGS. 1–3, the portions of the supplied alternating current wave during which the control lead 88 is so connected to power lead 22 may be simply and selectively varied by operation of the potentiometer 42 in the master control timer unit 10 of FIG. 1. As a consequence the illumination level of plural lamps so connected may be singly and simply varied by a single control, the potentiometer 42, of control unit 10. Clearly too, this master control timer unit, in accordance with the invention, may simply and effectively be employed through the medium of plural current control circuits in accordance with the invention to effect illumination level control of multiple lamps by way of multiple and variegated ballast arrangements in accordance with the invention.

There have been described representative embodiments of the invention. Numerous variations on these embodiments will readily occur to those skilled in the art without departing from the spirit and the scope of the invention.

What is sought to be secured by Letters Patent of the United States is:

1. Apparatus for controlling current flow through a plurality of fluorescent lamps which comprises, a rectifying bridge having first and second pairs of diagonally opposite terminals, an output load resistor connected to one terminal of said first pair, said first terminal pair being adapted for connection across a source of alternating current by way of said output load resistor, a control circuit connected across the terminals of said second pair, whereby conduction through said load resistor is enabled only upon conduction through said control circuit, a transformer having a primary and a first and second secondary winding, said primary winding being connected across said load resistor, a first controlled rectifier connected across said first secondary winding, a second controlled rectifier connected across said second secondary winding, means coupled from said controlled rectifiers for igniting and energizing a plurality of fluorescent lamps.

2. Apparatus for controlling current flow through a plurality of fluorescent lamps which comprises, a rectifying bridge having first and second pairs of diagonally opposite terminals, an output load resistor connected to one terminal of said first pair, said first terminal pair being adapted for connection across a source of alternating current by way of said output load resistor, a control circuit connected across the terminals of said second pair, whereby conduction through said load resistor being enabled only upon conduction through said control circuit; transformer means connected across said load resistor having a primary winding connected to opposite terminals of said load resistor, said transformer means having first and second secondary windings similarly oriented with respect to said primary winding, first and second controlled rectifiers, each of said first and second secondary windings being connected between one conduction electrode of a respectively associated controlled rectifier and a control electrode thereof, said rectifiers being together connected in closed series conducting relation and said secondary windings being connected in opposing controlling relation to said rectifier electrodes whereby said rectifiers may be alternatively conductive upon passage of current through said output load resistor.

3. Apparatus for controllably energizing a plurality of fluorescent lamps which comprises, a master control circuit having a pair of input terminals adapted for connection to a source of alternating current, said circuit further comprising a rectifying bridge having a first and a second pair of diagonally opposite terminals, an output resistor connected in series between one terminal of said first bridge pair and one input terminal of said pair, a controlled rectifier connected in conductive relation across said second pair of bridge terminals, a charging circuit connected across said controlled rectifier, said charging circuit comprising a capacitor and a variable resistor, whereby charging of said capacitor from said second pair of bridge terminals is selectively controlled by said variable resistor, means connected in circuit with a common point between said variable resistor and said capacitor for controlling conduction by said rectifier, a plurality of current control circuits coupled across said output resistor for controlling energization of a second plurality of discharge devices.

4. Apparatus as set forth in claim 3, in which each of said plurality of current control circuits has an input circuit connected across said output resistor, a next plurality of dimming ballast circuits, the circuits of said last named plurality being associated in conduction initiating relation with fluorescent lamps of said plurality, and means for connecting plural ones of said ballast circuits in controlled relation with at least one of said plurality of current control circuits.

5. Apparatus as set forth in claim 4 wherein a dimming ballast circuit of said plurality comprises a primary winding having first and second opposite terminals, first and second lead means for connection to an altenating current source, means connecting said first and second lead means, respectively, to said opposite terminals, means connecting said primary winding second terminal in energizing relation with one conduction electrode of a fluorescent lamp, a secondary winding, said secondary winding being mounted on a common core with said primary winding and having one terminal connected to a second electrode of said lamp, a control lead connected to the remaining terminal of said secondary and to a conduction electrode of said current control circuit, said current control circuit comprising means for establishing a conductive path between said last named conduction electrode and said first lead means upon conduction by said current control circuit, whereby opposite terminals of said fluorescent lamps are connected in conductive circuit upon conduction by said current control circuit.

6. Apparatus as set forth in claim 5 and, in combination therewith, means for selectively varying the conduction time of said current control circuit in relation to voltage wave variations on said first and second lead means.

7. Apparatus as set forth in claim 6 wherein said selectively varying means comprises a resistor-capacitor charging circuit adapted for connection across said first and second lead means, said charging circuit being connected and adapted for initiating conduction by said current control circuit upon charging of said capacitor to a preassigned voltage level.

8. A control circuit for varying alternating current flow through a plurality of fluorescent lamps each having first and second oppositely disposed electrodes and a ballast transformer comprising, first and second power leads for connection to a source of A.C. power, a two terminal primary winding and a spaced apart two terminal secondary winding, said windings being disposed on a common core, said windings having first and second terminals, said primary winding being adapted for connecting said first and second terminals to said power leads respectively, said second terminal being adapted for connection to said first electrode, said secondary winding having one terminal adapted for connection to said second electrode, a control lead connected to the remaining secondary terminal, a current control circuit having first and second series connected controlled rectifier devices connected for alternative conduction and, respectively, having first means for connecting a conduction electrode to a first one of said power leads and second means for connecting a conduction electrode to said control lead, and means for selectively establishing a short circuit connection from said control lead to said first power lead, whereby a conductive circuit is established between said lamp electrodes for energizing said lamp upon conduction by one of said rectifiers.

9. Apparatus as set forth in claim 8 and in combination therewith, a master controlled rectifier connected in circuit across said power leads, a capacitor connected in charging circuit across said power leads; said last named rectifier having a control electrode connected in circuit with said capacitor for supplying actuating power to said rectifier devices upon charging of said capacitor to a preassigned threshold level.

10. Apparatus as set forth in claim 9 which comprises a diode connected in circuit with said control electrode, said diode being poled for forward conduction in an enabling direction to said control electrode, whereby spurious currents in said circuit are prevented from disabling conduction by said master controlled rectifier.

11. Apparatus as set forth in claim 8 wherein said first rectifier conduction electrode connecting means comprises a high frequency energy filter for blocking passage of spurious signals to said first power line from said associated rectifier conduction electrodes.

12. Apparatus for controlling energizing current flow from a source of alternating voltage to a first plurality of fluorescent lamps which comprises, a master control unit connected for being energized by said alternating voltage, said master control unit having a pair of output leads and being adapted for transmitting a selected portion of said voltage through said output leads, a next plurality of current control circuits connected to be energized by said transmitted voltage portions, said current control circuits each having a current control lead and a power lead, means for connecting said power lead to one side of said source, a plurality of ballast arrangements respectively associated with the fluorescent lamps of said first plurality in controlling relation therewith, said ballast arrangements comprising a primary and a secondary winding, said primary having first and second terminals, means connecting said second terminal to a first conduction electrode of a respectively associated lamp, means for connecting said first and second terminals to said alternating voltage source, respectively, to said one side and to the remaining side, means connecting one terminal of said secondary to a second, opposite conduction electrode of said lamp, and means responsive to said selected voltage portion for connecting the remaining terminal of said secondary to said power lead by way of said control lead.

13. Apparatus as set forth in claim 12 wherein said current control circuits are connected to be energized by said transmitted voltage, said control circuits each comprising, a transformer having a primary winding connected across the output leads of said pair, and first and second secondary windings, a first and a second controlled rectifier, each of said rectifiers having first and second conduction electrodes and a control electrode, said secondary windings, respectively, being connected between said control electrodes and said conduction electrodes in oppositely controlling relation, whereby said rectifiers are driven to conduction alternatively by a transmitted voltage.

14. Apparatus for singly controlling operation of a first plurality of rapid start fluorescent lamps from a source of alternating current which comprises, a plurality of dimming ballast arrangements respectively associated with a lamp of said first plurality in energizing relation therewith, a lesser numbered third plurality of current control circuits each having a pair of output leads respectively connected in parallel controlling relation with plural ballast arangements of said second plurality, each of said current control circuits comprising a pair of input leads, a master control unit comprising, a rectifying bridge having first and second diagonally opposite terminal pairs, an output resistor connected to one terminal of said first pair, said resistor and said first terminal pair being adapted for connection in series with said source, a control circuit connected across the terminals of said second bridge pair, said circuit comprising a first branch and a second branch connected in parallel, said first branch comprising a controlled rectifier, defining a conduction path, and having a control electrode, said second branch comprising a unijunction transistor having conduction electrodes defining a second conduction path and charging circuit comprising a variable resistor and a capacitor connected in series across said second terminal pair for generating a control signal to render said unijunction transistor conductive in dependence on the state of charge of said capacitor, circuit means coupling said last named transistor to said controlled rectifier control electrode, and coupling means connected between said transistor and said rectifier control electrode for rendering said controlled rectifier conductive upon conduction by said unijunction transistor, for permitting conduction between said bridge second terminal pair thereby to enable conduction through said resistor from said source by way of said bridge first terminal pair, circuit means connected across said resistor to said current control circuit input lead pairs for enabling conduction through said control circuit from said pair of current control output leads for connecting an associated ballast in energizing relation with a respectively associated gaseous discharge device in accordance with conduction through said output resistor.

15. A fluorescent lamp current control circuit for controlling energizing of a plurality of lamps, said circuit comprising, a control lead, a power lead, first and second controlled rectifiers having cathode and anode conduction electrodes connected in series, said control and power leads being respectively connected to a like conduction electrode of said rectifiers, a pair of leads adapted for connection to a source of alternating current power, means connecting said circuit power lead to a first lead of said pair, means for connecting said pair of leads across primary windings of plural ballast transformers for energizing said lamps, and means connecting said control lead to one terminal of secondary windings of said plural ballast transformers, whereby upon conduction of one of said rectifiers, said secondary winding terminals are connected to one side of said primary windings by way of said control lead, said circuit power lead, and one lead of said pair.

16. Apparatus as set forth in claim 15 and, in combination therewith, means for selectively controlling conduction by said first and second rectifiers.

17. Apparatus as set forth in claim 16 wherein said selectively controlling means comprises a resistor connected between the leads of said pair, and means connected in series with said resistor for selectively controlling the duration of transmission through said resistor of portions of alternating voltage waves appearing on said pair of leads.

18. Apparatus as set forth in claim 19 wherein said series connected means comprises, a controlled rectifier having conduction electrodes connected across said pair of leads by way of said resistor and a control electrode, a transistor having a conduction path connected across said rectifier conduction electrodes, a load resistor connected between said transistor conduction electrode and a cathode electrode of said rectifier, diode means for coupling voltage signals generated by conduction through said last named resistor to said control electrode whereby conduction by said transistor enables conduction through said controlled rectifier to enable conduction by one of said first and second rectifiers to connect said plural ballast secondary windings in energized circuit with said plural ballast primary windings for energizing fluorescent lamps associated therewith.

References Cited
UNITED STATES PATENTS

| | | | |
|---|---|---|---|
| 3,130,347 | 4/1964 | Harpley | 315—100 |
| 3,159,766 | 12/1964 | Harpley | 315—100 |
| 3,201,597 | 8/1965 | Balan | 315—100 |
| 3,244,965 | 4/1966 | Gutzwiller | 307—88.5 |
| 3,249,806 | 5/1966 | Genuit | 315—100 |
| 3,284,667 | 11/1966 | Harris et al. | 315—100 |

JOHN W. HUCKERT, *Primary Examiner.*

R. F. POLISSACK, *Assistant Examiner.*